Patented June 6, 1933

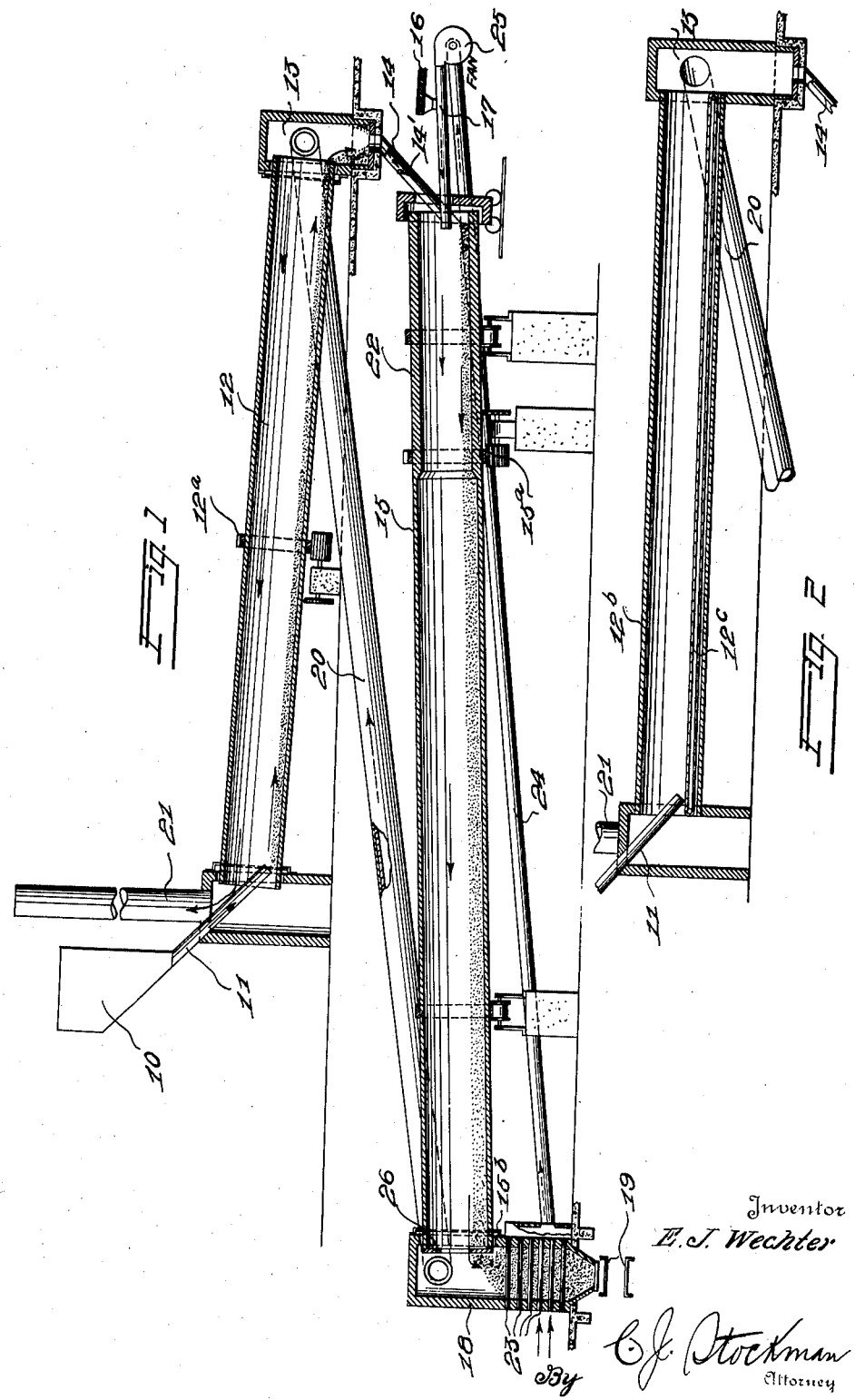

1,912,811

UNITED STATES PATENT OFFICE

EUGENE J. WECHTER, OF SPEED, INDIANA, ASSIGNOR TO LOUISVILLE CEMENT COMPANY, OF LOUISVILLE, KENTUCKY, A CORPORATION OF KENTUCKY

METHOD OF BURNING LIME AND CEMENT

Application filed May 11, 1927. Serial No. 190,476.

In the burning of lime and natural cement rock in the vertical type of kiln, it is necessary that the rock be from about three to four inches or larger in size, in order that proper combustion to effect calcination may be secured. Accordingly, it has been the universal practice to screen out the small rocks, namely, those from about three to four inches down to dust and since rocks of these sizes usually amount to from twenty-five to thirty percent of the total material, they form an item, the salvaging of which is important. The primary purpose of this invention is to salvage these smaller rocks which in many instances were allowed to go to waste in an efficient and economical manner, by providing a method capable of calcining the same in a wholly practicable way, that is, which will not be liable to overburn or underburn the small sizes of rock and will not be uneconomical in the use of the fuel employed for combustion purposes. In the practice of this method, resort is made to the rotary type of kiln, the method embodying certain steps by which the advantages incident to the use of such a type of kiln may be obtained without the disadvantages which have hitherto prevented the successful use of rotary kilns in the production of a high grade product from lime and natural cement in rock form.

In a general way, the method may be described as being one wherein the rocks to be treated (hereinafter called "raw material") are moved promiscuously along a defined course which includes (1) a preheating zone in which the raw material is subjected to the action of a heating agent whose temperature is of increasing instead of decreasing intensity, whereby the material is gradually dried and its temperature gradually raised to a point favorable for its subsequent treatment in the effective removal of all its carbon dioxide, (preferably one approximating that at which such effective removal may take place); (2) a combustion zone in which the preheated and dried raw material is rapidly and economically raised in temperature to the effective calcination point, and (3) a roasting zone in which the moving mass of raw material is retained at a substantially constant temperature until it has been deprived of sufficient carbon dioxide to render it fit for use.

In respect of the preheating step of this method it should be particularly understood that it is characterized by counter movement of the raw material and hot gases in heat transferring relation with each other, whereby the raw material is subjected first to the action of the gases at the coolest portion of the latter. In the practice of this step, the gases are led from the material discharging terminal of the roasting zone (that is, from the material discharging end of the rotary kiln) to the material discharging end of the preheater and flow through said preheater in a direction counter to that of the flow of the material through the preheater. This relative flow of the rocks and preheating agent is of prime importance since it avoids the dangers of explosions inseparably connected with the subjection of cold and wet rocks to a high temperature. In other words, when the flame or hot gases enter the preheater at the same end as the raw material, the intense popping and disintegration of the rock due to the volatilization of the moisture in the rocks cause the formation of a large amount of dust and fine material which will not properly burn in the main kiln and which in fact is so intense as to cause chipping and increased wear of the brick lining of the preheater.

Another important part of the method is the flow of the raw material through a combustion zone and then through a roasting zone in the same direction as that of the flow of the fuel used in producing the combustible gases. In respect of these zones, it may be said that in a very generic or general sense both are burning zones and both are roasting zones. As a matter of fact, however, the flow of the raw material in the kiln has such relation to the heating agent that the raw material in the passage through the kiln is subjected to two separate effects, successively, being in the first stage of its movement through the kiln rapidly raised in temperature to that at which it may most efficiently lose carbon dioxide and in the remainder of its movement through the kiln retained at said temperature until it has been deprived of carbon dioxide. That part of the rotary kiln through which the raw material passes while being quickly raised to the temperature at which it may lose carbon dioxide is what has hereinbefore been referred to as the "combustion zone" and that part of the kiln through which the raw material passes at the same temperature is what has been referred to as the "roasting zone". It may be here mentioned that the bringing about of the desired relationship between the raw material and heating agent to cause a rapid increase in the temperature to the point at which it may be deprived of carbon dioxide and then the retention of said raw material at said temperature, contemplates not only the passage of the raw material through the hottest part of the flame before said material reaches the roasting zone, but, moreover, contemplates a lesser depth of the material in the combustion zone than in the roasting zone.

It is, of course, difficult and unnecessary to set forth accurately the exact boundaries of the hottest parts of the flame, since this will depend upon the volume and speed of flow of the fuel and the temperature of the raw material at their points of delivery into the kiln.

It is evident, however, that the hottest part of the flame is near the point at which the fuel enters the kiln and that from that point onward the flame throughout a certain part of the length of the kiln may be of substantially constant temperature and then is of lesser temperature. In my practice, the raw material has been caused to enter the kiln from the preheater at a temperature of about 500° F.–800° F. so that its temperature can then be rapidly raised to the calcining temperature by its almost immediate entrance into the hottest part of the flame and by the intimate contact between all of its parts and the flame. Since its depth is less at this time than during its passage through the next zone (the roasting zone) it travels through the combustion zone at greater speed than through the roasting zone.

Thus, it will be noticed that according to this method, the raw material before entering the combustion zone has been gradually deprived of moisture and gradually raised in temperature, and in the combustion zone is suddenly raised to a calcining temperature. It now enters the roasting zone where its depth is increased and it traverses said zone at a slower speed, and is maintained at the calcining temperature until it has been brought into condition for use by the releasing therefrom of carbon dioxide. It may be noticed that the preheating step avoids dangers of explosions and disintegration, and generally is such as to cause the raw material to enter the combustion zone at a temperature and under all conditions most favorable to its being brought to what has herein been referred to as the effective calcining temperature as the first stage in its travel through the kiln and before the temperature of the gases of combustion have been substantially lowered, and that the method generally is such that the material is maintained at the calcining temperature without waste of heat; the temperature of the raw material and the temperature of the gases bearing such relation to each other that they mutually contribute to the retention of the material at the calcining point, since the heat of the gases and the heat of the material will be substantially the same in the roasting zone.

The fuel is fed into the kiln separately from the preheated material and adjacent the place at which said preheated material enters and the material flows progressively through the kiln in the same general direction as the fuel and gases of combustion. Preferably, the air used in the combustion of the fuel is preheated by subjecting it to the action of the heat of the hot burned product and is forcibly discharged into the combustion zone with the fuel.

The length of the kiln, the speed of travel of the raw material therein and the temperatures in various parts of the kiln are subject to variation. It has been my experience that raw material which has been subjected to my method is deprived of its carbon dioxide in from three to six hours, or thereabouts, instead of seventy-two hours, or thereabouts, required with the prevailing methods utilizing a vertical kiln and that the method has proved to be much more efficient and has produced a much higher grade of product than hitherto regarded as possible with relation to rotary kilns. These results have been secured from a rotary kiln of about 100–125 feet in length. I have found it to be beneficial to subject the material to treatment in the kiln in the presence of hot gases of combustion whose temperature is such as to raise it to an optimum temperature to lose carbon dioxide, as 1250°–1400° F., or thereabouts, in the case of natural cement rock or 1500°–1600° F., or thereabouts, in the case of lime; though these temperatures may vary, as is evident. I have also found it to be beneficial to maintain the material at a depth varying from about one foot in the combustion zone to about two feet in the roasting zone.

As near as I have been able to figure from my practical experience with this method, with relation to a kiln of about 100 feet in length, the best results have been secured when the fuel at its point of ignition, which is about 10 feet from its inlet to the kiln, has a temperature of about 2000° F. and a flame temperature of about 2500° F. a few feet further along in the kiln. The temperature of the gases of combustion at the outlet from the chamber 18 is about 1400° F. and at the inlet to the chamber 13 about 1250° F., and gradually reduces within the chamber 12 to about 300° F. where it first comes in contact with the raw material and then enters the stack.

The result is that the unheated raw material first comes in contact within the preheating chamber with gases having a temperature of only about 300° F. and in its progress through said chamber is gradually raised until its temperature is from 500° to 800°. It is discharged at the latter temperature directly into the kiln and immediately enters a zone having a temperature of about 2000° F. and passes quickly thence into a zone having a temperature of about 2500° F. When it has passed through these zones, the temperature of this raw material will have been raised to about 1400° to 1500° F. and the temperature of the gases will have been reduced to one approximating 1400° or 1500° F. The raw material has now also been formed into a mass which has much greater depth than that of the mass in the combustion zone and hence travels more slowly.

By this improved method lime can be burned at a ratio of four pounds of lime to one pound of coal whereas in former proposed methods of burning lime in the rotary type of kiln the ratio was two and one-half pounds of lime to one pound of coal. The quantity of lime burned by this method compares favorably with vertical kiln lime.

In the burning of natural cement a fifty percent increase in tensile strength is obtained over that produced in vertical kilns. This is due to the uniform burn, the variation in burn of one-fourth inch in rock and two and one-half inches in rock being not over one percent.

In short, it will be evident that a better product is produced with economy in the use of fuel as the result of the bringing of the rocks to a dried and heated condition gradually and then discharging them directly into a zone having a high temperature, by which the rocks are quickly brought to a calcining temperature and then by maintaining them at a substantially constant calcining temperature until deprived of carbon dioxide and rendered fit for use.

Apparatus suitable to carry this method into practice is illustrated in the accompanying drawing, in which Fig. 1 is a longitudinal sectional view and Fig. 2 is a similar view depicting a modification.

Referring to the drawing, 10 designates a suitable hopper from which the raw material to be treated is fed through a conduit 11 into one end of a preheating chamber 12 from whose opposite end the preheated raw material is discharged into a chamber 13. From the bottom of this chamber the material is discharged into a downwardly inclined conduit 14 which conducts it into the feeding end of a rotary kiln 15 from whose opposite end the calcined material is discharged into a chamber 18.

The preheating chamber 12 is preferably rotatable and inclined downwardly from its material receiving end to the chamber 13, as shown in Fig. 1; but where conditions are such as to make it desirable or more convenient to mount it horizontally, a structure such as that disclosed in Fig. 2 may be employed, in which it (the preheating chamber) marked 12$^b$ in Fig. 2, is rigidly mounted and is provided with a suitable endless conveyor 12$^c$ for conducting the raw material through the preheating chamber and into the chamber 13. In all other respects the apparatuses may be identical. When the preheating chamber is of the rotatable type, it may be rotated by a suitable gear mechanism, indicated at 12$^b$. The kiln 15 is rotated by a suitable gear mechanism, indicated at 15$^a$.

The numeral 16 designates a suitable fuel feeding conveyor which is in communication with a tube 17. This tube extends into that end of the kiln 15 into which the preheated raw material is fed from the chamber 13 by the conduit 14.

A suitably insulated conduit 20 extends from the chamber 18 at the material discharging end of the kiln to the chamber 13 at the material discharging end of the preheating chamber 12 or 12$^b$. This conduit 20 conducts the products of combustion which have passed through the kiln 15 into the chamber 13 at the material discharging end of the preheating chamber, 12 or 12$^b$. These products flow through the preheating chamber in a direction counter to that of the movement of the raw material and are drawn off into the atmosphere through the stack 21 at the material receiving end of said chamber.

The hot calcined material which is discharged into the chamber 18 flows downwardly within said chamber over a series of tubes 23 and onto a suitable conveyor, at 19, by which conveyor it is carried away.

The tubes 23 are open to the atmosphere at one end and into a box at their other end, and from the box a conduit 24 leads to a casing 25 in which there is a suitable fan. The tube 17 also communicates with the fan casing. The hot calcined material in its passage through the chamber 18 is cooled by and heats the air which is drawn through the pipes 23 and tube 24 and this heated air is fanned through the tube 17 with the fuel, and supports the combustion of the fuel.

The kiln 15 is preferably restricted in diameter adjacent its end at which the preheated raw material and the fuel are introduced, as shown at 22, and has a gas tight connection with the chamber 18 as indicated at 15$^b$. This latter end of the kiln is partially closed by a ring 26 to form a restricted outlet into the chamber 18 to thereby cause an increase in the depth of the material in what has been referred to as the "roasting zone" over that in what has been called the "combustion zone".

In the carrying out of the method in this apparatus the raw material to be treated is introduced in the hopper 10 and the fuel (which may be powdered coal or the like, or may be a suitable liquid or gaseous material, as preferred) together with the preheated air to support combustion are fed under pressure into the material-receiving end of the rotary kiln, through the tube 17. The raw material passes from the hopper 10, through the conduit 11 and into the feed end of the preheating chamber 12. From the discharge end of the preheating chamber it drops into the chamber 13 and thence through the conduit 14 and into the feed end of the rotary kiln 15 at a place adjacent the outlet end of the fuel supply tube 17. This raw material is formed in the rotary kiln 15 into a mass whose depth for a definite part of its length at the feed end of the kiln is of lesser thickness than its depth throughout the remainder of the length of said kiln, due in large part, at least, to the ring 26 at the discharge end of said kiln. From said discharge end, the roasted material flows into the cooling chamber 18 and through the discharge opening in the bottom of the latter and onto the conveyor 19 by which it is carried off to a place intended for its reception.

In its passage through the cooling chamber the hot roasted material is cooled by the currents of fresh air drawn through the pipes 23 and serves to preheat said air. This preheated air, as already stated, is drawn through the conduit 24 and discharged into the tube 17, by the fan 25 and acts to support combustion.

The gaseous products of combustion flow within the rotary kiln 22 to the material discharge end of the latter and through said discharge end to the conduit 20 and thence into the material discharging end of the preheating chamber 12 and through said chamber to the stack 21.

It will be apparent that the flow of the heating medium in relation to that of the raw material is such that there will be a counter flow of heating medium and raw material in the preheating chamber and a parallel flow of the heating medium and raw material in the rotary kiln and that the hottest part of the flame will be within that portion of the mass of preheated material which has the lesser depth within the rotary kiln.

Hence, there is within the preheating chamber a gradual and uniform drying and preheating of the raw material to a condition favorable for its subsequent treatment, with no danger whatsoever of internal explosions, immediately followed by a quick rise in temperature of the preheated material to the calcination point, within the feeding end of the rotary kiln and by a maintenance of said temperature substantially constant in its passage throughout the remainder of the kiln and until the material has been deprived of substantially all the ingredients which are intended to be expelled in the roasting operation.

By constricting that portion of the kiln forming the combustion or burning zone the hot gases of combustion come more intimately into contact with the material in order that the burning step may be most effectively carried out. The material slowly travels through and from the burning zone into the portion of the kiln of greater diameter, or the roasting zone, and when entering this zone, the material is at an optimum temperature to lose carbon dioxide. This temperature is about 1400° F. for cement rock and 1600° F. for limestone, although these temperatures may be variable.

It is preferable that the material at all times be from one foot in depth in the combustion zone to two feet in depth in the roasting zone in order that it remain in the kiln for a period to insure thorough burning. This is provided for by means of the ring 26.

It is preferable that no outside air be admitted at the discharge end of the kiln and hence a ring 15$^b$ is provided to exclude such air at this point.

The heated waste gases in the kiln are drawn off by means of the draft or stack 21 through the conduit 20 into the discharge end of the preheater and through the preheater over the material in a direction counter to the direction of travel of the material.

These heated gases passing over the material drive out any moisture that may be in the material and render same in a condition to be directly fed into the burning zone in a thoroughly dry and partially heated condition thus aiding the combustion as well as economizing in fuel.

It will be seen that the material may pass uninterruptedly from the hopper 10 through the conduit 11, preheater 12, chamber 13, conduit 14, kiln 15 and chamber 18 onto the conveyor 19 and that a flow of heated gases is maintained in the kiln in the direction of feed of the material and in the preheater in a direction counter to the direction of feed of material therein.

These heated gases are obtained from an otherwise wasted heat and are utilized in the different steps and thus make it possible to carry out this method with less fuel than would otherwise be required.

It will be understood that the end of the kiln into which the material to be treated and the fuel are introduced constitutes a burning zone, whether said end be restricted, as preferred, or not, and that the remainder of the kiln constitutes a roasting zone.

Reference has not hereinbefore been made to the fact that, in the practice of this method in the apparatus herein set forth anything more than merely a drying of the material takes place in the preheating step, yet it has been found in my practice of the method that in the preheating step the material is deprived of a part of its carbon dioxide—approximately five to ten per cent thereof. Mention is now made of this fact, since it becomes evident therefrom that the material when entering the calcining kiln is in a condition most favorable for the subsequent steps. In short, the correlation of the described steps, including the relative flows of the material, in rock form, and the heating medium, in the preheating chamber and through the combustion zone and roasting zone is such that these steps cooperate in the salvaging of material which in many instances has been thrown away and, moreover, produce in a most economical way, from such waste material a commercial material of superior quality.

The apparatus herein illustrated and described has been made the subject of a separate application for Letters Patent filed in the United States Patent Office of even date herewith and numbered, serially, 190,475.

Having now described the invention, what I believe to be new and desire to secure by Letters Patent, and what I therefore claim, is:—

1. The method of burning lime or natural cement in rock form, which comprises the steps of feeding the rocks into a preheating chamber, discharging the said rocks therefrom into a rotary kiln, injecting a combustible mixture including preheated air into the end of the kiln into which the rocks are discharged from the preheating chamber and withdrawing the hot gases of combustion from the discharge end of said kiln and feeding said gases into the preheating chamber and causing them to flow through said chamber in counter current heat transferring relation to the rocks in said chamber.

2. That improvement in the art of calcining lime or natural cement in rock form, including feeding the material into an appropriate chamber and its formation in said chamber into a progressively moving mass whose depth throughout the first part of the length is less than its depth throughout the remaining part of the length of the mass, and subjecting said mass to the action of heated gases of combustion whose flow is in the same general direction as that of the mass and whose hottest temperature is within that portion of the mass which is of the lesser depth.

3. That improvement in the art of calcining lime or natural cement in rock form which comprises as steps the feeding of the rocks through a hot flowing gaseous medium whose direction of flow is counter to that of the rocks to effect a gradual increase in the temperature of the latter to a point most favorable for the expulsion of their carbon dioxide content by subsequent heat treatment at higher temperatures and then discharging the thus heated rocks into an appropriate chamber and subjecting them while in motion in said chamber to the action of a heating medium which is separately introduced into the chamber and which flows in the same direction as the rocks and whose temperature is such as to quickly raise the temperature of the rocks to the point at which effective calcination is to take place and to maintain them at said point until they have been substantially freed of carbon dioxide.

4. That improvement in the art of calcining lime or natural cement in rock form: which includes, as steps thereof, feeding a combustible heating medium, separately from the material to be calcined, into that end of a rotary chamber at which the material to be calcined enters said chamber and causing a flow of said medium within said chamber and to the opposite end thereof and thence into one end of a preheating chamber and through the latter; and feeding the raw material in rock form into the end of the preheating chamber opposite that at which the heating medium from the rotary chamber enters the preheating chamber and discharging it from the end of said preheating chamber at which said products of combustion enter and into that end of the rotary chamber at which the heating medium enters the latter, and feeding the raw material while in rock form through said rotary chamber in the same general direction as the heating medium and in heat transferring relationship with the latter until substantially freed of carbon dioxide and then discharging it from the end of the rotary chamber at which the products of the heating medium are fed to the material discharging end of the preheating chamber.

5. A method of calcining lime or natural cement in rock form which comprehends the preheating of the raw material and the roasting of the preheated material while said material is in rock form and moving progressively through a first and a second chamber, respectively, in heat transferring relationship with a heating medium having a direction of flow counter to that of the raw material in the first chamber and substantially the same as that of the raw material in the second chamber; and in which said relationship effects a gradual increase in the temperature of the rocks to a point approximating that at which calcination may be effected and then a quick raising to the effective calcination point and retention at the latter point until the mass has been substantially freed of carbon dioxide, said method comprising as steps thereof, the feeding of the material in rock form into one end of the first chamber and its discharge from the other end of said chamber into one end of the second chamber and its discharge from the opposite end of the latter chamber, and also the feeding of a combustible medium separately from the cement or lime rocks into that end of the second chamber at which the rocks are received by said chamber and the withdrawal of the products of said medium from the opposite end of the second chamber and the feeding thereof into the end of the first chamber at which the rocks are discharged into the second chamber.

6. That improvement in the art of calcining lime or natural cement in rock form, comprising the feeding of a moving mass of the raw material and a heating agent in counter direction and in heating transferring relation with each other, to effect a gradual increase of the temperature of said mass to a point above that of the atmosphere but below that at which calcination is completed, then forming the thus heated material into a progressively moving mass whose depth throughout the first part of the length of the mass is less than its depth throughout the remaining part of the length of the mass, and subjecting said mass to the action of a heating agent having a direction of flow in the same general direction as that of the mass and whose hottest temperature is within that portion of the mass which is of the lesser depth.

7. The method of burning lime or natural cement rock which comprises as steps thereof: (1) subjecting of a moving mass of the raw material in rock form to the effect in a preheating chamber of a heated current whose direction of flow in the chamber is counter to that of said mass to thereby gradually preheat the rocks; (2) feeding the thus preheated material progressively into and through a rotary kiln having separate burning and roasting zones; and (3) feeding, separately from the preheated rocks, a heating medium into the end of the kiln at which said rocks enter the latter and withdrawing the products of combustion thereof which have passed through the kiln in heat transferring relation to the material therein and directing flow of said products to the material discharging end of the first mentioned chamber and through said chamber in counter direction to the flow of material therein for the preheating step.

8. The method of burning lime or natural cement, in rock form, which includes the feeding of a mass of the lime or cement rock through a preheater, discharging the same in preheated condition from said preheater into one end of a rotary kiln wherein calcination is to be effected and its discharge in calcined condition from the other end of the kiln; the method also including the passing of a current of atmospheric air through but out of contact with the mass of hot calcined material discharged from the kiln, the forcing of this thus heated air with an appropriate fuel into that end of the kiln in which the preheated material is introduced into the kiln, to support combustion, the flowing of the products of combustion through the kiln in the same direction as, and in heat transferring relation to the material, the withdrawing of said products from the kiln and their introduction into that end of the preheater at which the material is discharged and the flowing thereof through said preheater in a direction counter to the flow of the raw material through the preheater in a heat transferring relation to said material.

9. A method of burning lime or natural cement rock which comprises preheating the raw material, feeding the material into a chamber through which it is caused to travel in such a manner as to give greater thickness to the mass of material toward the discharge end than adjacent the inlet end, injecting fuel into the inlet end of said chamber, and withdrawing hot gases from the discharge end of the chamber and causing them to flow in counter current heat transferring relation to the material during the preheating stage of the method.

10. A method of burning lime or natural cement rock which comprises preheating the raw material, feeding the preheated material into a chamber through which it is caused to travel in such a manner as to give greater thickness to the mass of material toward the discharge end than adjacent the inlet end of said chamber, injecting separately from the material and into the inlet end of said chamber a combustible fuel containing air which has passed through but out of contact with the burned material, and withdrawing hot gases from the discharge end of the chamber and causing them to flow in counter current heat transferring relation to the material during the preheating stage of the method.

In testimony whereof I affix my signature.

EUGENE J. WECHTER.